United States Patent [19]

Smith

[11] Patent Number: 4,664,424
[45] Date of Patent: May 12, 1987

[54] HOSE COUPLING

[75] Inventor: Richard D. Smith, Yorkshire, England

[73] Assignee: Internationale Octrooi Maatschappij, Rotterdam, Netherlands

[21] Appl. No.: 548,770

[22] Filed: Nov. 4, 1983

[30] Foreign Application Priority Data

Nov. 12, 1982 [GB] United Kingdom ............... 8232380

[51] Int. Cl.⁴ ............................................. F16L 33/00
[52] U.S. Cl. ...................................... 285/256; 285/259
[58] Field of Search ............................... 285/256, 259

[56] References Cited

U.S. PATENT DOCUMENTS

| | | | |
|---|---|---|---|
| 2,535,460 | 12/1950 | Rotter et al. | 285/256 X |
| 2,562,116 | 7/1951 | Nelson | 285/259 X |
| 2,661,225 | 12/1953 | Lyon | 285/259 X |
| 3,073,628 | 1/1963 | Cline et al. | 285/259 X |
| 3,466,067 | 9/1969 | Oroin | 285/259 X |
| 4,139,224 | 2/1979 | Leach | 285/259 X |

FOREIGN PATENT DOCUMENTS

| | | | |
|---|---|---|---|
| 2159711 | 6/1973 | Fed. Rep. of Germany | 285/256 |
| 992378 | 5/1965 | United Kingdom | 285/256 |

Primary Examiner—Dave W. Arola
Attorney, Agent, or Firm—Cushman, Darby & Cushman

[57] ABSTRACT

A hose coupling of the so-called wire-trap type having an insert and ferrule adapted to be fitted to the end of a wire reinforced hose from which a portion of the inner and outer elastomeric core and cover is removed to expose the wire reinforcement, the coupling gripping the wire reinforcement in a zig-zag path formed between a rib and groove on opposite ones of the ferrule and insert, the flanks of the rib and the side walls of the groove being parallel and inclined at between 10° and 30° to the plane of the rib and groove.

2 Claims, 4 Drawing Figures

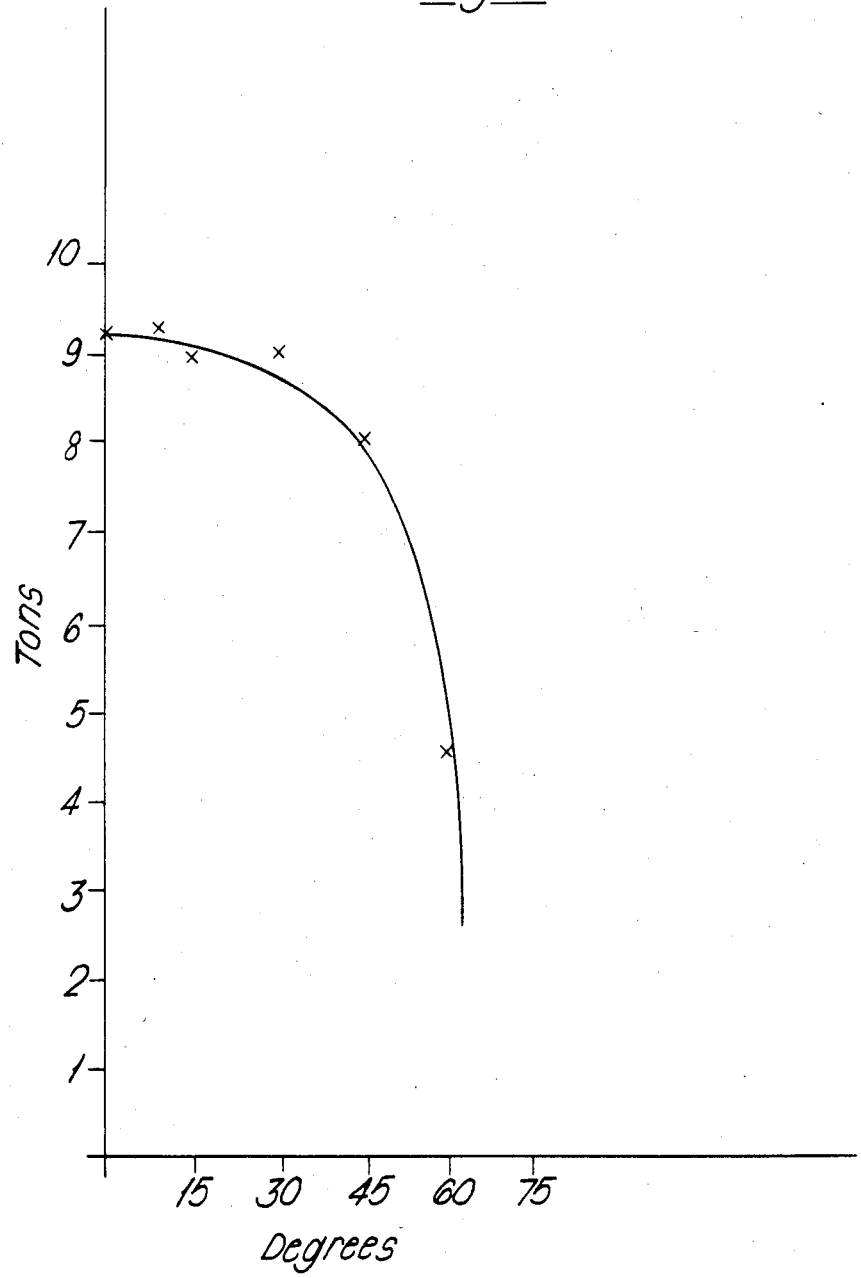

HOSE COUPLING

This invention relates to a hose coupling comprising an insert and a ferrule adapted to be compressed to secure the insert within the end of a hose by gripping the hose end between the ferrule and insert and particularly to a coupling of the so-called wire trap type adapted to grip wire reinforcement exposed at the hose end by removing a portion of the elastomeric inner core and outer cover.

When a hose is subjected in service to high and intermittent pressures, particularly when pressure increases are rapid, it has been found that removing the elastomeric inner core and outer cover over a short length at the hose end and gripping the wire reinforcement between the ferrule and insert of a hose coupling reduces the incidence of service failures arising from the hose being forced out of the coupling due to the grip of the coupling on the wire reinforcement being lost or the wire reinforcement fracturing. To enhance the grip on the wire reinforcement the wire is commonly deformed to lie in a zig zag gap between the ferrule and insert as shown in GB Patent Specification No. 1 085 277 and German OS 2 104 744 in both of which specifications the angles of the zig-zag gap are about 45°. Generally the more abrupt the alternate turns of the zig-zag gap are the greater the likelihood of fracturing the wire either during fitting of the coupling or in service and in GB Patent Specification No. 1 424 384 there is described a fitting in which the zig-zag gap has two legs of different abruptness, the most abrupt being at 40° to the plane of the rib and groove forming the gap.

According to the present invention there is provided a hose coupling comprising an insert and a ferrule adapted to be compressed to secure the insert within a hose end having an exposed length of wire reinforcement deformed into a zig-zag gap formed between a co-operating annular rib and groove on respective parts of the coupling, the groove being defined between a pair of outwardly inclined side walls and the rib by a pair of inwardly inclined flanks, the side walls and flanks being inclined at an angle of between 10° and 30° to the plane of the rib and groove. It has been found that inclining both flanks and both walls of the annular rib and groove respectively within this range provides the best grip on the wire combined with minimal wire fracture and a single such zig-zag gap is sufficient to hold the hose in the coupling.

Preferably the annular rib is formed on the ferrule and the annular groove is formed in the insert to economise on the amount of material required to produce the coupling since providing the rib on the insert would usually necessitate the length of the ferrule being increased to accommodate the annular groove therein.

Whilst the depth of the groove has an effect upon the amount of grip that can be exerted upon the wire reinforcement the depth thereof is largely limited by the hose and particularly by the thickness of the inner core of elastomeric material within the wire reinforcement. To enable the wire reinforcement to overlie the groove before deformation the maximum diameter of the groove must be less than the inner diameter of the reinforcement. Also the minimum diameter of the groove is largely determined by the flow diameter within the insert and the required strength of the insert. Preferably the groove has depth substantially equal to the thickness of the inner core of elastomeric material of the hose.

The side walls of the groove and the flanks of the rib are preferably inclined at an angle of between 10° and 20° to the plane of the rib and groove, the preferred angle being 15°.

Individual layers of wire reinforcement in a pressure hose are isolated from one another by insulating plys of elastomeric material. The minimum dimension of the zig-zag gap between opposed flanks and walls should not be greater than the thickness of the wire reinforcement absent any insulating plys therebetween. The wire reinforcement is thus gripped between the flanks and walls. Preferably the minimum dimension between opposed flanks and side walls is less than the thickness of the wire reinforcement absent any insulating plys therebetween, the wire reinforcement being partially embedded into the flank walls on swaging to enhance the positive grip upon the wire reinforcement.

At that region of the zig-zag gap between the base of groove and the crest of the rib the gap preferably has a dimension not greater than the thickness of the wire together with the insulating plys therebetween to minimise the risk of the crest of the rib causing collapse of the base of the groove when the ferrule is swaged. Slight compression of the insulating plys can be achieved between the base of the groove and crest of the rib without causing collapse of the insert.

The invention will now be more particularly described with reference of the accompanying drawings in which:

FIG. 4 is a diagram showing the tensile strength of various forms of wire traps.

Figure 1:
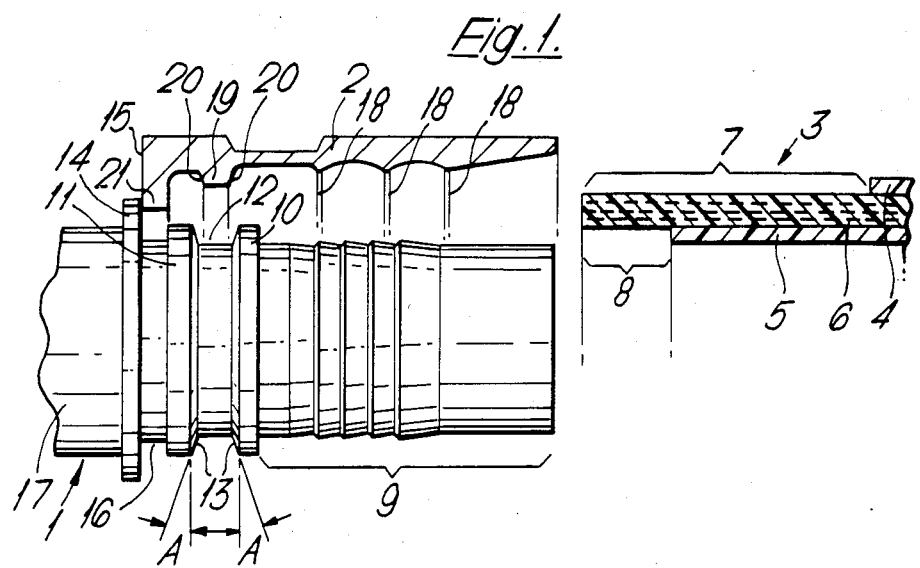
FIG. 1 is a side elevation of the hose coupling according to the invention before swaging.

Referring to FIG. 1 there is shown a hose coupling comprising an insert 1 and a ferrule 2, one half of the ferrule being shown in cross section.

The coupling is adapted to be fitted to a wire reinforced pressure hose shown at 3 which has an outer cover 4 and inner core 5 of elastomeric material surrounding the multiple layers of wire reinforcement 6. The layers of wire reinforcement are isolated from one another by insulating plys of elastomeric material in the usual way.

The end of the hose is skived to remove a length 7 of the outer cover 4 and length 8 of inner core 5 shorter than length 7 as shown to expose the wire reinforcement 6.

The insert has at one end a portion 9 adapted to be inserted within the inner core 5 of the hose so that the inner core 5 abuts a rib 10 on the insert, the rib having an outer diameter such that the wire reinforcement passes over the rib. Rib 10 and a second rib 11 define between them a wire trap groove 12 in the insert having outwardly inclined side walls 13 inclined at an angle 'A' to the plane of ribs 10 and 11. An annular abutment 14 on the insert is provided against which end face 15 of the ferrule abuts to position the ferrule relative to the insert before swaging. A recess 16 is formed between the abutment 14 and the rib 11. The other end 17 of the insert is provided with the desired termination such as a male or female thread for connection purpose.

The bore of the ferrule 2 is provided with a plurality of axially spaced gripping projections 18 to enhance the grip of the ferrule on the wire reinforcement 6 over the portion 9 of the insert. An annular rib 19 within the bore of the ferrule has inwardly inclined flanks 20 inclined at the same angle 'A' as the side walls 13 in the insert so that respective flanks 20 and side walls 13 are parallel. A lip 21 is formed at the end of the ferrule adjacent the end face 15.

Figure 2:
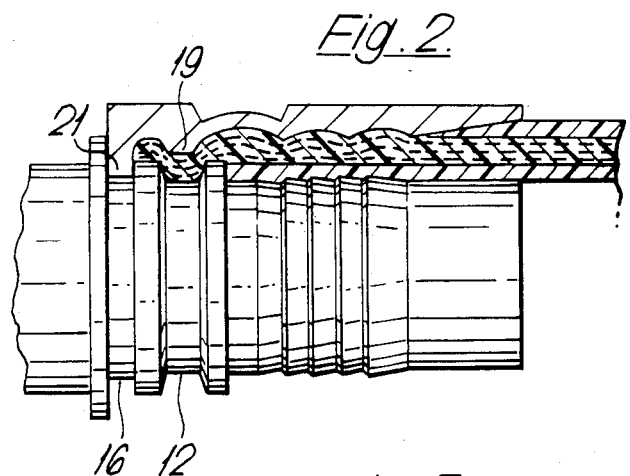
FIG. 2 is a side elevation of the hose coupling of FIG. 1 after swaging.

The hose coupling can be fitted to the end of the hose by placing the ferrule on the end of the hose and inserting the end portion 9 of the insert within the end of the hose until the wire reinforcement traps the lip 21 between the end of the wire reinforcement and abutment 14, the inner core 5 of the hose lying adjacent to the rib 10. The ferrule is then compressed or swaged into the position shown in FIG. 2 in which the rib 19 on the ferrule and the groove 12 on the insert together define a zig-zag gap within which the wire reinforcement is trapped. The lip 21 is located within the recess 16 on the insert to positively secure the ferrule to the insert.

Figure 3:
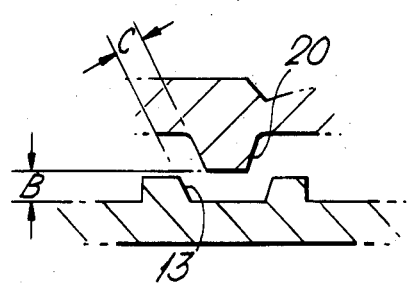
FIG. 3 is a side elevation on an enlarged scale of the wire trap portion of the coupling as shown in FIG. 2.

Before swaging the inner diameter of the rib 19 is larger than the outer diameter of the wire reinforcement to allow the wire reinforcement to pass therethrough to the lip 21. After swaging the ferrule is compressed so that as shown on an enlarged scale in FIG. 3 the distance 'B' between the rib 19 and the base of the groove 12 is not greater than the thickness of the wire reinforcement together with the insulating plys of elastomeric material between the layers of wire, i.e. the uncompressed thickness of the layer of wire reinforcement. The rib is central to the groove so that the respective flanks of the rib 19 are equidistant from the side walls 13 of the groove and spaced a distance 'C' which is not greater than and preferably slightly less than the thickness of the wire layers alone of the wire reinforcement without the insulation layers of elastomeric material. The distance 'C' may be less than the thickness of the wire layers alone if the swaging causes the reinforcement to bed into the flanks 20. Thus the wire reinforcement is compressed and gripped primarily between the flanks 20 and side walls 13.

The grip of hose couplings as described was tested by conducting tensile tests on couplings swaged to pressure hose. The tests were carried out with a range of couplings in which only the angle 'A' of the flanks and side walls was varied, the angle 'A' being common to the flanks and side walls in each coupling. The results are shown in FIG. 4 in which the tensile strength in tons at which the hose was pulled out of the coupling is shown as the ordinate and the angle 'A' is shown on the abscissa. The tests were all carried out using 1¼" bore hose to SAE 100R13 having an inner core 2.5 mm thick. The wire reinforcement comprises six layers of wire each 0.56 mm diameter giving a total thickness of wire reinforcement of 3.36 mm. With the insulating plys of elastomeric material between the wire reinforcement layers the total thickness of the wire reinforcement was 5 mm. The ferrules were swaged to slightly compress the wire reinforcement in the bottom of the groove 12, the distance 'B' being 4 mm. The distance 'C' was 2.35 mm, i.e. less than the thickness of the wire reinforcement without the insulating plys, the wire reinforcement having bedded into each of the flanks 20 of the ferrule and into each of the flanks 13 of the insert by an amount substantially equal to the thickness of one layer of wire.

The depth of the groove 12 in the insert was 2.25 mm substantially equal to the thickness of the inner core of the hose.

It can be seen that as the angle 'A' decreases, i.e. the acuteness of the zig-zag gap increases, the greater the grip on the hose exhibited by the increase in tensile load before the hose pulls out of the coupling. Whilst the load which can be withstood increases greatly from an angle 'A' of 60° to an angle 'A' of 45° the strength of the grip on the hose is greatest at angles 'A' below 30°. Furthermore, although there is a further small increase in grip when angle 'A' decreases below 15° it was found that as the angle reduced below 10° to 0° there was evidence of the wires shearing. This shearing did not affect the tensile load that could be applied but would lead to premature failure of the hose connection when the hose is subjected to the cyclical changes in internal pressure as would be experienced in use. It can therefore be understood that a preferred range for angle 'A' is between 10° and 20° and most preferably 15°, the latter value giving the best grip without any problems arising from shearing of the wires.

I claim:

1. A high pressure hose coupling comprising an insert and a ferrule adapted to be compressed to secure the insert within a hose and having an exposed length of wire reinforcement deformed into a zig-zag gap formed between a co-operating annular rib and groove on respective parts of the coupling, the groove being defined between a pair of outwardly inclined side walls and the rib by a pair of inwardly inclined flanks, the respective side walls and flanks being parallel and inclined at an angle of between 10° and 30° to the plane of the rib and groove; said wire reinforcement including layers of wire with insulating plys disposed therebetween; the minimum dimension of the zig-zag gap between opposed flanks and walls being less than the thickness of the wire reinforcement less the insulated plys therebetween; the dimension of the zig-zag gap at the region between the base of the groove and the crest of the rib being not greater than the total thickness of the wire reinforcement; the wire reinforcement being embedded into each of the side walls and into each of the flanks by an amount substantial equal to the thickness of one layer of wire.

2. A hose coupling according to claim 1 in which the side walls of the groove and flanks of the rib are inclined at an angle of between 10° and 20° to the plane of the rib and groove.

* * * * *